Nov. 26, 1963     P. E. FISKE     3,112,482
RECEIVE LOBING ANTENNA

Filed Sept. 9, 1960     3 Sheets-Sheet 1

INVENTOR.
PAUL E. FISKE

INVENTOR.
PAUL E. FISKE

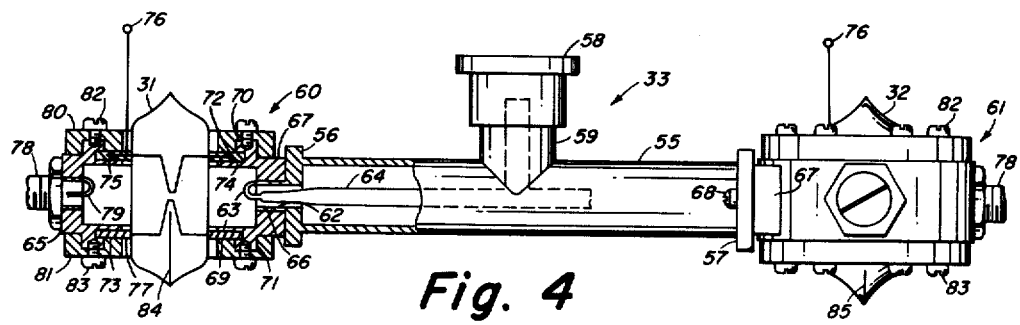
Fig. 4
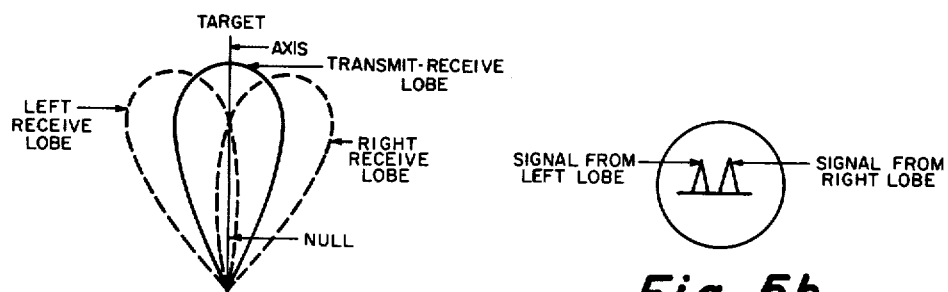
Fig. 5a
Fig. 5b
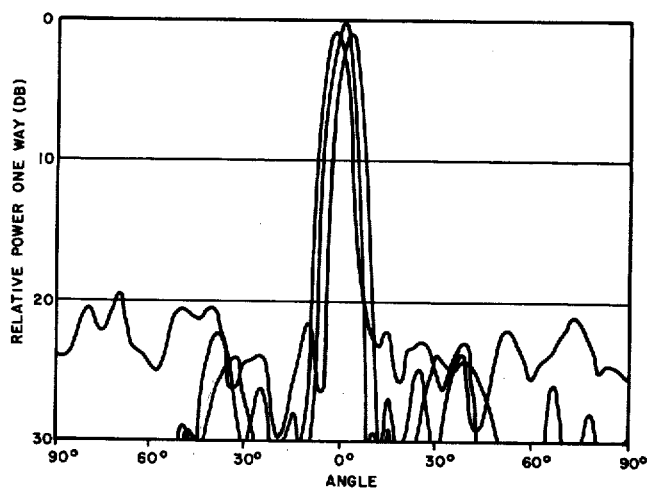
Fig. 6
INVENTOR.
PAUL E. FISKE United States Patent Office 3,112,482
Patented Nov. 26, 1963

3,112,482
RECEIVE LOBING ANTENNA
Paul E. Fiske, 1059 Devenshire Drive,
San Diego 7, Calif.
Filed Sept. 9, 1960, Ser. No. 55,099
16 Claims. (Cl. 343—16)
(Granted under Title 35, U.S. Code (1952), sec. 266)

The invention described herein may be manufactured and used by or for the Government of the United States of America for governmental purposes without the payment of any royalties thereon or therefor.

The present invention relates generally to radar tracking systems and in particular to an improved radar lobing antenna system for tracking and command guidance of a guided missile.

Antenna lobing per se is not new, but the prior art devices producing same in many instances have proven unsatisfactory. For example, lobing may be effected by moving the center of phase of the projector by mechanically shifting the entire projector left or right or rotating it completely with respect to its on-axis position, or it may be achieved by mechanically switching two or more antennas. Sector-scanning in the former instance results in excessive wear of both the drive and bearing repeat systems and may also allow the antenna to be beamed on the target for only ten to thirty percent of the time and at a rate determined by the sector-scan which, in turn, requires that any radar computer associated therewith must store commands and transmit only when the antenna swings by the target. Mechanical switching between antennas in the latter instance requires additional equipment which makes inefficient use of space as a result of increased bulk and adds additional weight to the carrier vehicle or other support structure. Both of the foregoing systems are subject to the disadvantage that instability may be introduced as a result of mechanical imperfections that cause undue noise and distortions in the received image. Moreover, inasmuch as the operator of radar systems, such as the SV-1, cannot ordinarily determine small target bearing changes, and since he is responsible for the information fed to the computer, the signals representing said information may be erratic and contain undesirable noise components that require heavy smoothing circuitry which, in turn, tends to limit the response time of the computer.

The present invention overcomes these disadvantages in that antenna lobing is effected by using a unique and improved electronic switching circuit in conjunction with appropriate antenna structure and radar equipment.

It is, therefore, an object of this invention to provide an improved lobing antenna system for radar tracking and controlling guided missiles.

Another object of this invention is to provide an improved lobing antenna system which will feed smooth, relatively noise-free data signals to a radar computer.

A further object of this invention is to provide an improved lobing antenna system having increased target bearing accuracy and resolution.

Another object of this invention is to provide a radar antenna lobing system eliminating the necessity of rapid sector scanning.

Another object of this invention is to provide increased radar accuracy.

A further object of this invention is to provide a radar lobing antenna system having improved reliability.

A still further object of this invention is to provide means for continuously beaming maximum radar energy at all times on a missile being guided thereby.

Another object of this invention is to provide a more secure missile tracking and guiding antenna system which is less susceptible to enemy determination and countermeasures.

Another object of this invention is to provide an improved lobing antenna system that may be used in conjunction with navigation instruments.

Still another object of this invention is to provide a means for improving fire-control accuracy.

A further object of this invention is to provide a means for permitting missile guidance commands to be transmitted by a radar system as rapidly as they are generated by the guidance computer thereof.

Another object of this invention is to provide an electronically actuated lobing antenna system which reduces the wear and maintenance requirements of the radar antenna drive and repeater mechanisms.

Another object of this invention is to provide an improved lobing antenna system that may be adapted for waterproof installation on missile guidance submarines.

Other objects and many of the attendant advantages of this invention will be readily appreciated as the same becomes better understood by reference to the following detailed description when considered in conjunction with the accompanying drawings wherein:

FIG. 4 is an elevational view of the transmit-receive switch assembly incorporated in this invention, partially in pictorial form and partially with parts broken away to diagrammatically depict a cross-section of pertinent internal structure;

FIG. 5 contains theoretical views of the receive lobes and corresponding bearing scope display signals; and FIG. 6 shows a composite of transmit and receive patterns of the subject antenna system when lobing.

Figure 1:
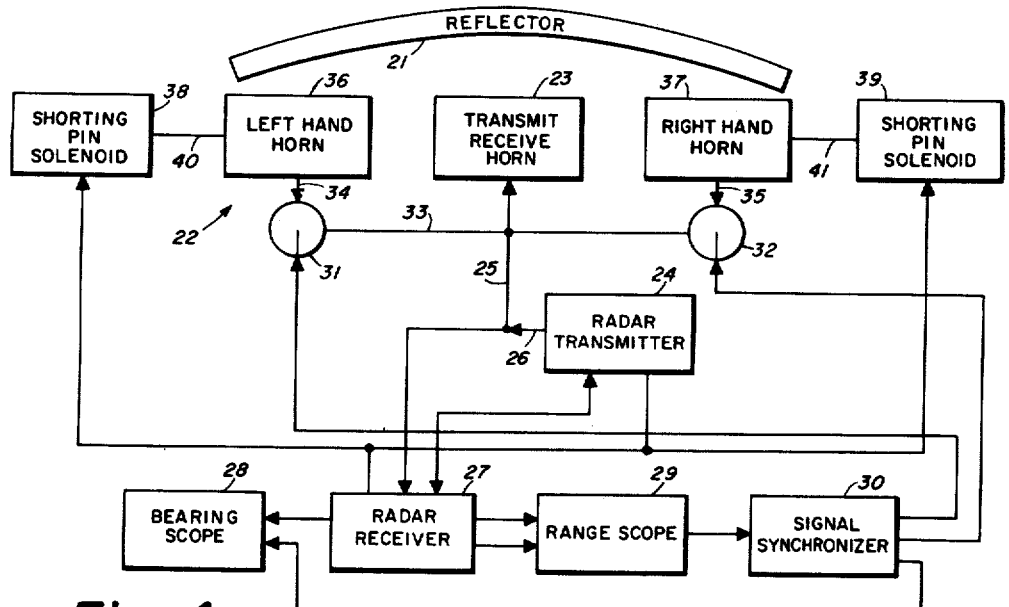
FIG. 1 is a block diagram of the complete radar lobing system constituting this invention.

Referring now to the drawings, wherein like reference characters designate like or corresponding parts throughout the several views, there is shown in FIG. 1 an entire radar antenna lobing system comprising a reflector unit 21 and an antenna array 22 having a trio of horns, including a central transmit and receive waveguide horn 23 of the one and one-half by three inch horizontally polarized type, or the like, connected to a radar transmitter 24 in the usual manner by means of conventional waveguides 25 and 26 and to a radar receiver 27 by means of the aforesaid waveguide 25. Of course, radar transmitter 24 and radar receiver 27 may be considered as the transmit and receive portions of the same radar set if so desired and each may be timely switched into and out of operation as necessary to comply with overall operational requirements, conditions, and circumstances. Thus, it should be understood that the interconnection thereof shown herein is merely diagrammatical for the purpose of this disclosure and may in actual application take the form of any appropriate preferred radar-computer embodiment. This is true, although it should also be understood that the subject system was invented and originally intended as an improvement adjunct of the U.S. Navy SV-1 Radar and is still experimentally used therewith to an advantage.

Radar receiver 27 has three output signals that are pertinent to this invention. One of these signals is the target bearing intelligence signal which is applied to a bearing indicator oscilloscope 28. Another is a synchronizing pulse applied to a range indicator oscilloscope 29 delayed by an amount set by the range dial. And the third of these signals is the range intelligence signal which is likewise fed to the range scope. The aforementioned range scope synchronizing pulse passes through the range scope and is applied as the input signal to a signal synchronizer 30, which will be explained in detail below.

Signal synchronizer 30 performs two functions which are of paramount importance in this invention. First, it provides a sweep synchronizing voltage for bearing scope 28; second, it provides voltages to a pair of TR switch tubes 31 and 32, such as, for example, of the 721b or BL-601 types, disposed in the cavities of a transmit-receive switch assembly 33 connected to waveguide 25. Said TR switch tubes 31 and 32 are respectively connected through coaxial cables 34 and 35 to a left-hand waveguide horn 36 and a right-hand waveguide horn 37 flanked on each side of the aforementioned central horn 23, all of which combine to form antenna array 22. These left and right-hand horns may be of the order of three-eighths inches wide, but are the same height dimensions as central waveguide 25. A pair of shorting pin solenoids 38 and 39 deactivate left-hand horn 36 and right-hand horn 37, respectively, by means of shorting pins 40 and 41 which are mechanically actuated thereby to short said horns when the entire system is being used as a conventional radar without benefit of the antenna lobing effected by this invention. Hence, said solenoids 38 and 39 are also appropriately connected to radar transmitter and receiver 24 and 27 for manual or other control purposes thereat.

Figure 2:
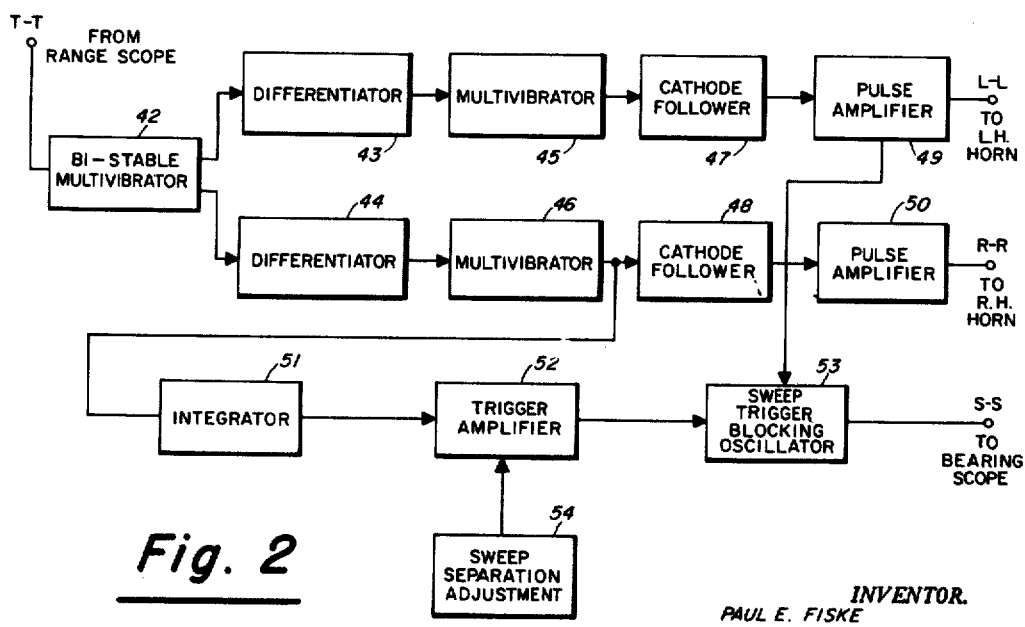
FIG. 2 is a block diagram of the signal synchronizer portion of the diagram of FIG. 1.
Figure 3:
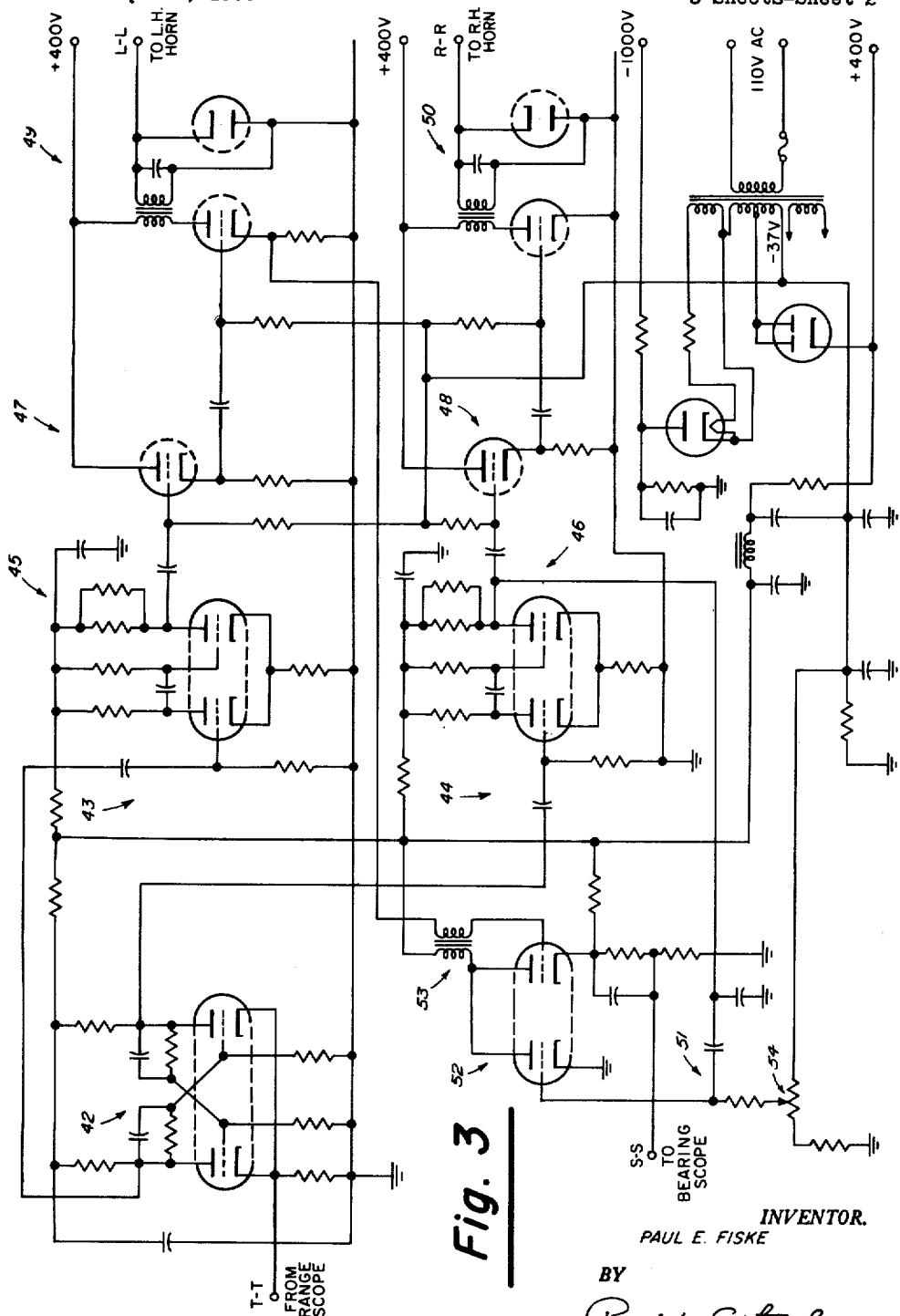
FIG. 3 is a schematic circuit diagram of the signal synchronizer.

As previously mentioned, an important component of the entire radar antenna lobing system constituting this invention is the signal synchronizer. Referring now to FIGS. 2 and 3, signal synchronizer 30 is shown as receiving trigger pulse T—T from the range scope and applying it to a bistable multivibrator 42 which generates a square wave at one-half the repetition frequency of said trigger pulse. The outputs of alternate stages of multivibrator 42 are respectively differentiated in differentiators 43 and 44 which, in turn, produce positive pulses that are, respectively, applied to fire twenty-five microsecond multivibrators 45 and 46 on alternate pulses from the range scope unit. The outputs from multivibrators 45 and 46 are positive pulses approximately twenty-five microseconds wide and have amplitudes of about fifty volts. They are, respectively, fed through circuit isolation cathode followers 47 and 48 to pulse amplifiers 49 and 50.

The positive pulse output from multivibrator 46 is also applied to an integrator 51 where it is integrated and fed to a trigger amplifier 52 for appropriate amplification thereof before being applied to the input of a normal sweep trigger blocking oscillator 53. Blocking oscillator 53 also receives as a second input thereto one of the outputs from the aforementioned pulse amplifier 49. Due to the relative time delay of the inputs to blocking oscillator 53 it is alternately triggered thereby. But, while it is being actuated by one of said inputs, it automatically blocks any interference signals that may be applied as the other of said inputs and vice versa. Thus, it can be seen that blocking oscillator output S—S is a clean twenty-five volt pulse of five microseconds width that is used to timely synchronize the sweep of the aforementioned target bearing display oscilloscope 28 with the operation of the left and right antenna receiving lobe patterns, whereby the signals received by the subject antenna system due to lobing operation are appropriately displayed as a pair of synchronized signals on said bearing scope.

By setting the bias on trigger amplifier 52 by means of a manually operable sweep separation adjustment 54, it is possible to delay the triggering of blocking oscillator 53 by a predetermined amount, causing the sweep trigger synchronized with the right antenna lobe to be started at a later time, which, in turn, causes the sweep of bearing scope 28 to be delayed and the separation of the signals displayed thereon adjusted accordingly.

Referring now to FIG. 4, the previously mentioned transmit-receive switch assembly 33 and TR tubes 31 and 32 incorporated therein are shown in greater structural detail and as including a seven-eighths inch rigid coaxial T section 55 having flanges 56 and 57 at the ends thereof. Another flange 58 is disposed at the end of a leg portion 59 of said T section and is adapted for connection at any pertinent location of the aforementioned waveguide 25 (FIG. 1). At the ends of said T section and attached to said flanges 56 and 57 are radio frequency (RF) switches 60 and 61. These switches are identical in structure and are mounted on the T section in mirror image fashion; consequently, only the details of the left cutaway switch portion will be described in detail herein, while the right switch portion will only be mentioned generally, inasmuch as it is intended to be depicted as a pictorial view in the referenced drawing figure.

At the outer end of flange 56, a pipe extension 62 is integrally attached and connected thereto, and extending in an outwardly direction is an RF loop electrode 63 curved back to electrically connect to an inner conductor 64 of said coaxial T section 55. A split cylindrical member 65 having an aperture 66 and a boss 67 thereabout is mounted flush against flange 56 in such manner that pipe extension 62 mates with aperture 66 in an electrically conductive, relatively tight fit. Securing means such as screws 68 fasten said cylindrical member to said flange and hold loop electrode 63 in a cavity 69 of the order of $1\frac{1}{16}$ x 1.755 inches inside diameter constituting the hollow portion thereof.

At each end of hollow cylindrical member 65, a pair of circular bosses 70 and 71 are integrally connected thereto, and a pair of slots 72 and 73 are disposed in the inside diametrical periphery of said cylindrical member, with one each adjacent each of said bosses. A Teflon washer 74 is mounted in one of said slots and has an insulated, ring-shaped, metallic electrode 75 contained therein with an electrical lead 76 extending therefrom. The other of said slots has a support ring 77 disposed therein. At the outer ends of cylindrical members 65, coaxial couplings 78 are mounted. Each of these couplings are, of course, adapted to be electrically connected to each of said side horns as previously mentioned and illustrated diagrammatically in FIG. 1. Another RF electrode loop 79 is connected to said cylindrical member and extends appropriately into the aforementioned cavity 69. Of course, the end of said RF electrode loop that is not connected to said cylindrical member is adapted for connection to the inner conductor of a coaxial cable which, in turn, is connected to one of the side horns. A first ring-shaped cap 80 having a U-shaped cross-section fits over circular boss 70 and holds the split cylindrical member together, as well as properly securing and positioning Teflon washer 74 and electrode 75. Another ring-shaped cap 81 having a U-shaped cross-section fits over circular boss 71 and also holds the split cylindrical member together, as well as securing support ring 77. Screws 82 and 83 respectively fasten caps 80 and 81 to opposite ends of said cylindrical member 65.

Transmit-receive (TR) tubes 31 and 32 are disposed in the aforementioned cavities of the cylindrical members of RF switches 60 and 61 respectively. These tubes are held in place as a result of a fairly tight fit between the glass envelope thereof and the inside diameters of ring shape electrode 75 and support ring 77. Keep alive elements 84 and 85 may be used in conjunction with an associated power supply (not shown) if desired. When the 600 volt potential is applied at lead 76 of one or the other of these TR tubes from the aforementioned signal synchronizer 30, the gas therein ionizes causing a 25 db insertion loss through the cavity and an effective short across the line at that point. If the TR tubes are located at a distance from the junction of the coaxial T equal to an even multiple of a quarter-wavelength of the received signal, substantially no energy will be absorbed by the fired tube and, hence, there will be substantially no loss of energy in the conducting portion of the transmit-receive switch assembly.

Briefly, the operation of the subject invention when used as a missile tracking and guidance system is as follows:

During the transmission period, high power electromagnetic energy is timely propagated through waveguides 26 and 25 to central horn 23 of antenna array 22, from which it is broadcast into space. To appropriately direct the path in space which said broadcast energy takes, said antenna may have an appropriate reflector, refractor, or electromagnetic lens such as reflector 21 associated therewith. As the aforesaid electromagnetic energy travels up waveguide 25, part of the energy is coupled into each of the side guide portions of transmit-receive switch 33 to TR tubes 31 and 32. Because the radio frequency power thereof is sufficient to cause a low impedance breakdown to occur across the inner face of the window of each TR tube, a short circuit essentially occurs therein. This short effectively deactivates both left-hand horn 36 and right-hand horn 37, simultaneously, while the electromagnetic energy is being broadcast by the center projector horn. Center horn 23 is actually the primary radiator and is ordinarily disposed at the focus of the reflector, thus causing the main lobe of the transmitted beam to be on axis, as is theoretically shown in FIG. 5 of the drawing. At the conclusion of the transmission period, the breakdown at the windows of both TR tubes decay in preparation for a receive period.

During reception, the three horn antenna array provides three diverging energy beams in space, as is also shown theoretically in FIG. 5 of the drawing. The left-hand and right-hand horns thereof are so disposed with respect to the center horn thereof to cause the left and right receive beams to be accurately positioned so that their common crossover is located on axis with the transmit beam, thereby providing a null for precision tracking purposes. Although the transmitted energy always radiates dead ahead, the received energy is alternately detected on the left or right beam. This is true because either the left-hand and central horns or the right-hand and central horns are active at any given instant. Either one of the side horns may be prevented from feeding its energy to main waveguide 25 by application of a voltage of the order of 600 volts to its respective TR switch tube. Thus, for example, when tube 31 is fired, no energy will be conducted from left-hand horn 36, and the energy reaching radar receiver 27 will be determined by and come from right-hand horn 37 and central projector horn 23. Likewise, when tube 32 is fired, no energy will be conducted from right-hand horn 37, and the energy reaching radar receiver 27 will be determined by and come from left-hand horn 36 and central projector horn 23. Thus, it can be seen that the apparent center of phase of the antenna array can be moved electronically by making the beam sequence to follow, for example, the order of: center, left, center, right, and then repeat. At a pulse rate of four hundred per second, the left beam detects two hundred pulses per second and the right beam detects two hundred pulses per second at a switching rate of 400 times per second.

Although the switching of electromagnetic energy occurs in the transmit-receive switch assembly as a result of the firing of the TR tubes, signal synchronizer 30 causes said TR tubes to timely fire to make said switching possible in accordance with realistic operational lobing patterns, such as, for example, those illustrated in FIG. 6.

In order to achieve this end, synchronizing pulses are fed from radar receiver 27 through range scope 29 to signal synchronizer 30 where they are processed to define TR tube firing signals and bearing scope sweep trigger signals corresponding to reception lobing patterns and bearing scope sweep, respectively, and also characterized as desired by the radar operator at any given moment to provide optimum operational conditions.

The signal synchronizer depicted in both FIG. 2 and FIG. 3 is the heart, so to speak, of this invention in that it plays an exceedingly important role therein. Of course, it must function in combination with the aforementioned elements, but in so doing, lends a unique function to the combination which causes vastly improved overall results to be effected.

The pulses received by synchronizer 30 are divided by two in bistable multivibrator 42 and the pair of resulting square wave outputs therefrom are fed to a pair of corresponding processing channels which are herein referred to as the odd-number signal channel and the even-number signal channel and disclosed as the top and bottom substantially identical channels of FIG. 2, respectively. In these channels, said bistable multivibrator output signals are differentiated in differentiators 43 and 44 to form positive pulses which are applied to multivibrators 45 and 46 in such manner as to fire same on alternate pulses from the range unit, thereby delaying the output of multivibrator 46 relative to the output of multivibrator 45, after which said multivibrator outputs are fed through cathode followers 47 and 48 for circuit isolation purposes, and then amplified to approximately 600 volt outputs L—L and R—R in pulse amplifiers 49 and 50, respectively. Output signal L—L is twenty-five microseconds (2 miles) in width and is, of course, applied to TR tube 31 for timely firing thereof for antenna lobing purposes. Likewise, output signal R—R is twenty-five microseconds (2 miles) in width and is applied to TR tube 32 for the same reason.

Since multivibrators 45 and 46 are both twenty-five microsecond multivibrators, their positive pulse outputs are twenty-five microseconds wide and have fifty volt amplitudes. Since, as previously mentioned, these multivibrators are connected for alternate firing by the input pulses from the range scope, even-number signal channel multivibrator 46 should be considered for the purpose of this disclosure as having its output delay twenty-five microseconds relative to the output of odd-numbered signal channel multivibrator 45.

In order to appropriately synchronize the sweep of the bearing scope with the reception lobe patterns for monitoring thereof by the radar operator, the delay output from multivibrator 46 is also applied to integrator 51 for shaping thereby, after which it is amplified in trigger amplifier 52 and coupled as one of the inputs to normal sweep trigger blocking oscillator 53. An output signal taken from the cathode of pulse amplifier 49 is likewise coupled as one of the inputs to said sweep trigger blocking oscillator 53 where it is timely correlated with the other input thereto to provide an output S—S which appropriately synchronizes the sweep of bearing scope 28 to display the signals received by the left and right antenna lobes, as is shown in FIG. 5b. Because the sweep length of the bearing scope is set as some predetermined distance such as, for instance, two miles, delaying the start of the even-numbered pulses causes two targets to appear on the face of the cathode ray tube thereof, and these two targets represent the signals from said left and right lobes. As said FIG. 5b also shows, when the antenna array points directly at the target, the signals from the two lobes are equal in amplitude. If the antenna points slightly away from the target, one signal increases in and the other signal decreases in amplitude. It can, therefore, be seen that to keep the antenna pointed directly at the target, the radar operator has only to turn it on its mounting structure until the left and right lobe signals are equal in amplitude. In order to facilitate displacement of said left and right lobe signals for visual purposes, adjustment of the latter is accomplished by means sweep separation adjustment 54 which is manipulated as desired by the radar operator.

In event it is desired or necessary to use the radar set incorporating the subject system as a conventional radar for search or other purposes without benefit of the inventive aspect thereof, the left-hand and right-hand horns may be deactivated and, for all practical purposes, eliminated by shorting them out. This is simply accomplished by the radar operator's energizing shorting pin solenoids 38 and 39 by appropriate switch operation at the radar set control panel which, in turn, causes shorting pins 40 and 41 to short out side horns 36 and 37, respectively. When said side horns are shorted, center transmit-receive horn 23 is the only one that is active, and the entire radar then functions in the usual manner.

Obviously many modifications and variations of the present invention are possible in the light of the above teachings. It is therefore to be understood that within the scope of the appended claims the invention may be practiced otherwise than as specifically described.

What is claimed is:

1. A receive lobing antenna system comprising in combination, a first antenna horn, a second antenna horn spacially disposed to the left of said first antenna horn, a third antenna horn spatially disposed to the right of said first antenna horn and in line with said first and second antenna horns, a radar receiver, and means connected to each of said antenna horns for alternately connecting both said first and second antenna horns and both said first and third antenna horns to said radar receiver.

2. The device of claim 1 further characterized by shorting means connected to said second and third antenna horns adapted for operation at said radar receiver for effectively deactivating said second and third horns while either is connected to said radar receiver.

3. A receive lobing antenna system comprising in combination, a left-hand antenna horn, a center antenna horn, a right-hand antenna horn, a radar receiver, a main waveguide interconnecting said center antenna horn and said receiver, a transmit-receive switch connected between said left-hand and right-hand horns and said main waveguide, and means interconnecting said transmit-receive switch and said radar receiver for actuating said switch for effectively connecting said center and left-hand horns thereto simultaneously and for effectively connecting said center and right-hand horns thereto simultaneously in alternation with the simultaneous connection of said center and left-hand horns thereto.

4. The device of claim 3 wherein said transmit-receive switch connected between said left-hand and right-hand horns and said main waveguide includes a coaxial T section having a first flange adapted for connection to said main waveguide, second and third flanges at opposite ends thereof, a pair of cavitated cylindrical members attached to said second and third flanges respectively, means connected to each of said cylindrical members adapted to electrically connect same to the aforesaid left and right hand horns respectively, a pair of TR tubes supported in the cavities of said pair of cylindrical members respectively, a pair of insulating washers surrounding said TR tubes respectively, a pair of electrodes insulatedly mounted within said washers respectively, and a pair of electrical leads respectively connected between said electrodes and the aforesaid means for actuating said transmit-receive switch.

5. The device of claim 3 wherein said means interconnecting said transmit-receive switch and said radar receiver for effectively connecting said center and left-hand horns thereto simultaneously and for effectively connecting said center and right-hand horns thereto simultaneously in alternation with the simultaneous connection of said center and left-hand horns thereto consists of a signal synchronizer.

6. A receive lobing antenna system comprising in combination, a trio of antenna horns adapted for receiving electromagnetic energy, a radar transmitter, a radar receiver, a main waveguide interconnecting said radar transmitter, said radar receiver, and one horn of said trio of antenna horns, a transmit-receive switch connected between said main waveguide and the other horns of said trio of antenna horns, a bearing scope coupled to said radar receiver, a range scope coupled to said radar receiver, and means interconnecting said range scope, said transmit-receive switch, and said bearing scope for alternately synchronizing the sweep of said bearing scope with the lobular reception of said electromagnetic energy by predetermined alternate pairs of the aforesaid antenna horns.

7. The device of claim 6 wherein said means interconnecting said range scope, said transmit-receive switch, and said bearing scope for alternately synchronizing the sweep of said bearing scope with the lobular reception of said electromagnetic energy by predetermined alternate pairs of the aforesaid antenna horns consists of a bi-stable multivibrator having a pair of relatively delayed outputs, an odd-numbered signal channel connected to said bi-stable multivibrator for response to one of said pair of relatively delayed outputs, an even-numbered signal channel connected to said bi-stable multivibrator for response to the other of said pair of relatively delayed outputs, an integrator coupled to an output of said even-numbered signal channel, a trigger amplifier connected to the output of said integrator, a sweep trigger blocking oscillator connected to said trigger amplifier and said odd-numbered signal channel for producing bearing scope sweep synchronizing signals in accordance with and in response to outputs therefrom, and means connected to said trigger amplifier for varying the time interval between said bearing scope sweep synchronizing signals as desired.

8. In an echo-ranging lobing antenna system, a receiver, a bi-stable multivibrator connected to said receiver for generating a pair of alternate output signals in response to a trigger signal therefrom, a pair of differentiators connected to said bi-stable multivibrator for response to each of said pair of alternate output signals respectively, a pair of twenty-five micro-second multivibrators respectively coupled to the outputs of said differentiators, a pair of cathode followers respectively connected to the outputs of said multivibrators, a pair of pulse amplifiers respectively connected to the outputs of said cathode followers, and a sweep trigger blocking oscillator connected to an output of one of said pair of pulse amplifiers and effectively connected to the output of one of the aforesaid multivibrators.

9. In a radar lobing antenna system, means for converting an input trigger signal into a pair of square waveform output signals each of which has one-half the repetition frequency of said input signal, a first means connected to said first mentioned means for differentiating one of said pair of square waveform output signals, a second means connected to said first mentioned means for differentiating the other of said pair of square waveform output signals, a first multivibrator means coupled to said first differentiating means for response to the differentiated signals therefrom, a second multivibrator means coupled to said second differentiating means for response to the differentiated signals therefrom, a first circuit isolation means connected to the output of said first multivibrator means, a second circuit isolation means connected to the output of said second multivibrator means, a first amplifier means coupled to the output of said first circuit isolation means, a second amplifier means coupled to the output of said second circuit isolation means, means connected to said second multivibrator for integrating the output therefrom, a third amplifier means coupled to the output of said integrating means, a blocking oscillator means connected to outputs of said trigger pulse amplifier and the aforesaid first pulse amplifier, and a sweep separation adjustment means coupled to the aforementioned trigger amplifiers.

10. In an echo-ranging system, first, second, and third transducers adapted for receiving propagated energy from the ambient environment thereof, a receiver, a main waveguide interconnecting said first transducer and said receiver, a first radio frequency switch connected between said second transducer and said main waveguide, a second radio frequency switch connected between said third transducer and said main waveguide, and means interconnecting said receiver and said first and second radio frequency switches for alternately connecting said second and third transducers to said main waveguide during the simultaneous reception of the aforesaid propagated energy by all of said transducers.

11. The device of claim 10 further characterized by shorting means interconnecting said receiver and said second and third transducers for deactivating said second and third transducers individually and collectively as desired.

12. The device of claim 10 wherein said first and second radio frequency switches include ionizable TR tubes.

13. A method of electronically lobing a receiving antenna comprising positioning a main antenna horn at the focal point of a reflector, flanking said main antenna horn with a pair of additional antenna horns each of which is disposed on the opposite sides of said main antenna, continuously connecting said main antenna horn and alternately connecting each of said pair of additional antenna horns to a receiver, displaying signals representing the energy received by all of said antenna horns as said side horns are alternately connected to said receiver, and synchronizing the alternate connection of said side horns with the reception of said energy received thereby and the displayed representation thereof.

14. A signal synchronizer for timely and alternately actuating each of a pair of switching means comprising in combination, a first multivibrator having a pair of stages, a first differentiator connected to the output of one of said stages, a second multivibrator coupled to the output of said first differentiator, a first cathode follower connected to the output of said second multivibrator, a first pulse amplifier coupled to the output of said first cathode follower, a second differentiator coupled to the output of the other stage of said first multivibrator, a third multivibrator connected to the output of said second differentiator, a second cathode follower coupled to the output of said third multivibrator, and a second pulse amplifier connected to the output of said second cathode follower.

15. A signal synchronizer comprising in combination, a first multivibrator having a pair of stages, a first differentiator connected to the output of one of said stages, a second multivibrator coupled to the output of said first differentiator, a first cathode follower connected to the output of said second multivibrator, a first pulse amplifier coupled to the output of said first cathode follower, a second differentiator coupled to the output of the other stage of said first multivibrator, a third multivibrator connected to the output of said second differentiator, a second cathode follower coupled to the output of said third multivibrator, a second pulse amplifier connected to the output of said second cathode follower, an integrator coupled to the output of said third multivibrator, a trigger amplifier having a pair of inputs and an output with one of said inputs connected to the output of said integrator, means connected to the other of said trigger amplifier inputs for making a sweep separation adjustment thereat, and a sweep trigger blocking oscillator having a pair of inputs and an output with one of said inputs connected to the output of said trigger amplifier and the other of said inputs coupled to the output of the aforesaid first pulse amplifier.

16. A signal synchronizer for synchronizing the sweep of a bearing scope with the lobular reception of predetermined incoming energy by alternate pairs of stationary transducers comprising in combination, a bistable multivibrator having a pair of relatively delayed outputs, an odd-numbered signal channel connected to said bistable multivibrator for response to one of said pair of relatively delayed outputs, an even-numbered signal channel connected to said bistable multivibrator for response to the other of said pair of relatively delayed outputs, an integrator effectively coupled to an output of said even-numbered signal channel, a trigger amplifier connected to the output of said integrator, a sweep trigger blocking oscillator connected to said trigger amplifier and said odd-numbered signal channel for producing bearing scope sweep synchronizing signals in accordance with and in response to the outputs therefrom, and means connected to said trigger amplifier for varying the time interval between said bearing scope sweep synchronizing signals as desired.

References Cited in the file of this patent

UNITED STATES PATENTS

| | | |
|---|---|---|
| 2,492,354 | Busignies | Dec. 27, 1949 |
| 2,597,862 | Greig | May 27, 1952 |
| 2,803,817 | Marasco | Aug. 20, 1957 |
| 2,929,056 | Page | Mar. 15, 1960 |

Disclaimer 3,112,482.—*Paul E. Fiske*, San Diego, Calif. RECEIVE LOBING ANTENNA. Patent dated Nov. 26, 1963. Disclaimer filed Dec. 9, 1963, by the inventor.

Hereby enters this disclaimer to claim 4 of said patent.

[*Official Gazette February 18, 1964.*]